United States Patent Office 3,296,299
Patented Jan. 3, 1967

3,296,299
METHOD FOR INHIBITING THE FORMATION OF ACETALDEHYDE IN THE SOLUTION CONTAINING VINYL ACETATE AND ALCOHOL
Masao Mori, Ohgaki, Yasuo Kotani, Hirakata, and Yukio Fujita, Kumamoto, Japan, assignors to Nippon Gosei Kagaku Kogyo Kabushiki Kaisha, Osaka, Japan, a corporation of Japan
No Drawing. Filed May 16, 1961, Ser. No. 110,353
Claims priority, application Japan, July 22, 1960, 35/32,137
5 Claims. (Cl. 260—488)

The present invention relates to a method for inhibiting the formation of acetaldehyde in the solution containing vinyl acetate and alcohol. More particularly, the present invention relates to a method for inhibiting an ester-interchange reaction between vinyl acetate and alcohol in the solution to result in the formation of acetaldehyde.

It is known that a lower aliphatic alcohol such as methanol or ethanol is one of the most convenient solvents for vinyl acetate in its polymerization process, particularly when the polymerization process is followed by the hydrolysis process to produce polyvinyl alcohol.

It is also known, however, that the formation of acetaldehyde caused by the ester-interchange reaction between vinyl acetate and alcohol is generally observed in the solution containing both of them. The presence of acetaldehyde in vinyl acetate is undesirable in most cases, since acetaldehyde even in small amount may act as retarder or chain-transfer agent in the polymerization process of vinyl acetate and, moreover, may cause discolouration of the resulting polymer or polyvinyl alcohol obtained from said polymer.

It is an object of the present invention to provide a method for inhibiting the formation of acetaldehyde in the solution containing vinyl acetate and alcohol at room temperature or an elevated temperature.

A particular object of the present invention is to provide a method for inhibiting the formation of acetaldehyde in the solution containing vinyl acetate and alcohol during the polymerization process of vinyl acetate to obtain its polymer from which polyvinyl alcohol of high quality may be produced.

Other objects of the present invention will be apparent from the following detailed description and claims.

It has now been found that the formation of acetaldehyde in the solution containing vinyl acetate and alcohol may be inhibited successfully by the addition of an inhibiting amount of at least one of such certain organic acids and their salts as defined hereinafter as inhibitor. They are selected from the group consisting of aliphatic and aromatic polycarboxylic acids, mono- and poly-carboxylic acids substituted by at least one of hydroxyl, amino and nitro groups, and the alkali salts of said acids. Such compounds are also known as chelating agents in general. The examples of said organic acids suited for the inhibitor include oxalic acid, malonic acid, succinic acid, maleic acid, phthalic acid, glycollic acid, lactic acid, glyceric acid, malic acid, tartaric acid, citric acid, salicyclic acid, amino-acetic acid, glutamic acid, imino-diacetic acid, nitrilo-tri-acetic acid, ethylendiamine-tetraacetic acid, nitro-acetic acid, nitro-benzoic acid, etc.

According to the present invention, any troubles caused by the formation of acetaldehyde during the period of storage, shipping or distillation of the solution containing vinyl acetate and alcohol may be eliminated. Moreover, the polymerization process of vinyl acetate in alcoholic solution may be carried out under the absence of acetaldehyde, substantially, to produce polymerized vinyl acetate from which polyvinyl alcohol of commercial value for its increased whiteness in appearance is obtained.

In carrying out the method of the present invention, it is necessary to employ the organic acids or their salts as inhibitor within the range of amount determined carefully in each case, since the use of the large excess of said acids or salts may accelerate the formation of acetaldehyde against the objects of the present invention. Depending on numerous factors, the adequate amounts of the inhibitors to be used may be varied in a wide range. In practice, however, the range of 5–50 parts by weight of the acids or 5–10 parts by weight of the salts per million parts by weight of the solution containing vinyl acetate and alcohol is preferably employed in most cases.

The method of the present invention may be generally applied to any solution containing vinyl acetate and at least one of lower aliphatic alcohols such as methanol and ethanol in any proportion with or without other solvents or water, unless the solution contains chemically active substances which tend to react with the organic acids or their salts used as inhibitor.

The present invention is illustrated in detail by the following examples. Parts and percentages specified are by weight unless otherwise indicated.

Example 1

Several organic acids and a salt were tested for their effectiveness as inhibitor for the formation of acetaldehyde in the solution consisting of 48.0% of vinyl acetate, 51.1% of methanol, 0.75% of methyl acetate and 0.15% of acetaldehyde; In each case, a sample of said solution containing a small amount of the inhibitor to be tested was placed in a glass flask provided with a reflux condenser and then heated to reflux for 6 hours. The contents of acetaldehyde in each sample of the solution treated by the foregoing procedure are given in the following table. Runs designated as A, B and C show the results obtained by the use of 5, 10 and 50 p.p.m. (parts per million), based on the total weight of the previous solution, of the inhibitor, respectively. The control noted at the bottom of the following table was a sample of the solution which was subjected to the same condition as those samples containing an inhibitor except that no inhibitor was used. The data in the table serve to illustrate the advantages of the method of the present invention.

| Run | A | B | C |
|---|---|---|---|
| Inhibitor: | Percent | Percent | Percent |
| Oxalic acid | 0.25 | 0.31 | 0.71 |
| Citric acid | 0.23 | 0.16 | 0.20 |
| Sodium citrate | 0.34 | 0.38 | 1.30 |
| Nitrilo-tri-acetic acid | 0.23 | 0.16 | 0.26 |
| o-Nitro-benzoic acid | 0.21 | 0.28 | 0.95 |
| Control | 1.52 | 1.52 | 1.52 |

Example 2

The acetaldehyde-free solution consisting of equal quantities of vinyl acetate and ethanol was employed in a group of tests.

The following table shows the contents of acetaldehyde in each sample of said solution treated in a similar manner as described in Example 1. The runs A, B and C signify the use of 5, 10 and 50 p.p.m. of the inhibitor, respectively. The control was prepared in the same way except that no inhibitor was added.

| Run | A | B | C |
|---|---|---|---|
| Inhibitor: | Percent | Percent | Percent |
| Phthalic acid | 0.04 | 0.04 | 0.06 |
| Tartaric acid | 0.03 | 0.04 | 0.04 |
| Sodium tartarate | 0.14 | 0.26 | 1.14 |
| Control | 0.93 | 0.93 | 0.93 |

*Example 3*

A series of tests were made to determine the effectiveness of several organic acids and a salt as inhibitor for the formation of acetaldehyde in the polymerization process of vinyl acetate in alcoholic solution followed by the alcoholysis process to produce polyvinyl alcohol. In each case, 80 parts of vinyl acetate together with 20 parts of methanol, 10 p.p.m. of one of the inhibitors to be tested and 0.02 mol percent, based on the amount of vinyl acetate, of $\alpha,\alpha'$-azo-bis-isobutyronitrile as initiator were placed in a reactor, and then polymerized at 65° C. until the completion of polymerization was 75%. Finally methanol was added, and the residual vinyl acetate was distilled off. The polyvinyl acetate thus obtained was then saponified by adding sodium hydroxide to produce polyvinyl alcohol. Whiteness in the appearance of the resulting polyvinyl alcohol and extinction coefficient of the peaks at 280 m$\mu$ and 320 m$\mu$ in the ultraviolet absorption spectrum of the same, which are markedly affected by the presence of acetaldehyde in the polymerization process of vinyl acetate, are given in the following table. The effectiveness of the method of the present invention for inhibiting the formation of acetaldehyde in the polymerization process of vinyl acetate in alcoholic solution is indicated by the increased whiteness and the decreased extinction coefficient of the resulting polyvinyl alcohol as compared with the control prepared in the same way except that no inhibitor was employed.

| Inhibitor | Whiteness[1] | Extinction Coefficient[2] | |
|---|---|---|---|
| | | At 280 m$\mu$ | At 320 m$\mu$ |
| Citric acid | 95.8 | 0.041 | 0.031 |
| Sodium citrate | 94.0 | 0.055 | 0.038 |
| Tartaric acid | 95.6 | 0.047 | 0.033 |
| Nitrilo-triacetic acid | 95.5 | 0.043 | 0.031 |
| Ethylendiamine-tetra-acetic acid | 95.7 | 0.044 | 0.032 |
| Phthalic acid | 95.3 | 0.048 | 0.034 |
| o-Nitro-benzoic acid | 94.5 | 0.052 | 0.035 |
| Control | 92.0 | 0.073 | 0.045 |

[1] Given by the percentage of the reflective power, measured by means of a photometer of polyvinyl alcohol to that of magnesium oxide employed as standard.
[2] The aqueous solution of polyvinyl alcohol with concentration of gram per 100 cc. was employed as sample for the measurements.

*Example 4*

The procedure of Example 3 was followed with the exception that in these cases the various amounts of citric acid were employed as inhibitor and 0.02 mol percent, based on the amount of vinyl acetate, of acetylperoxide was employed instead of $\alpha,\alpha'$-azo-bis-isobutyronitrile as initiator. The results of these tests are given in the following table.

| Amounts of citric acid | Whiteness* | Extinction Coefficient* | |
|---|---|---|---|
| | | At 280 m$\mu$ | At 320 m$\mu$ |
| 0 p.p.m | 90.2 | 0.177 | 0.117 |
| 5 p.p.m | 94.7 | 0.081 | 0.048 |
| 20 p.p.m | 94.9 | 0.080 | 0.050 |
| 40 p.p.m | 94.5 | 0.078 | 0.047 |

*See footnote (2) under the table in Example 3.

What we claim is:
1. A method for inhibiting the formation of acetaldehyde in a solution containing vinyl acetate and a lower aliphatic alcohol, which comprises adding into said solution at least one inhibitor selected from the group consisting of aliphatic monocarboxylic acids, aliphatic polycarboxylic acids, aromatic polycarboxylic acids, mono- and polycarboxylic acids each substituted by at least one radical selected from the group consisting of hydroxy, amino and nitro and the alkali salts of the members of said first-named group, said inhibitor being added in the amount of 5 to 50 parts by weight per million parts by weight of solution when said inhibitor is in free acid form, and 5 to 10 parts by weight per million parts by weight of solution when said inhibitor is in the salt form.
2. The method of claim 1, wherein the aliphatic polycarboxylic acid is selected from the group consisting of oxalic acid, malonic acid, succinic acid and maleic acid.
3. The method of claim 1, wherein the aromatic polycarboxylic acid is phthalic acid.
4. The method of claim 1, wherein the substituted acid is selected from the group consisting of glycollic acid, lactic acid, glyceric acid, malic acid, tartaric acid, citric acid, salicylic acid, amino-acetic acid, glutamic acid, imino-diacetic acid, nitro-acetic acid, nitrilo-triacetic acid, ethylendiamino-tetra-acetic acid and nitrobenoic acid.
5. The method of claim 1, wherein said aliphatic alcohol is selected from the group consisting of methanol and ethanol.

References Cited by the Examiner

UNITED STATES PATENTS

| 2,351,658 | 6/1944 | Berne-Allen | 260—488 |
| 2,467,774 | 4/1949 | Plambeck | 260—91.3 |
| 2,484,415 | 10/1949 | Malm et al. | 260—91.3 |

FOREIGN PATENTS 567,464   2/1945   Great Britain.

OTHER REFERENCES

Hopff et al.: Makromoleculare Chemie, vol. 18/19, pgs. 227–38 (1956).
Edelmann et al.: Faserforsch in Textiltech, vol. 9, pages 375–8 (1958) CA (1960), 6/83C.

JOSEPH L. SCHOFER, *Primary Examiner.*

HAROLD BURSTEIN, JAMES A. SEIDLECK,
                                         *Examiners.*

J. F. McNALLY, *Assistant Examiner.*